Oct. 13, 1936.   C. V. WERNER ET AL   2,057,352
METHOD OF BREWING
Filed May 23, 1933
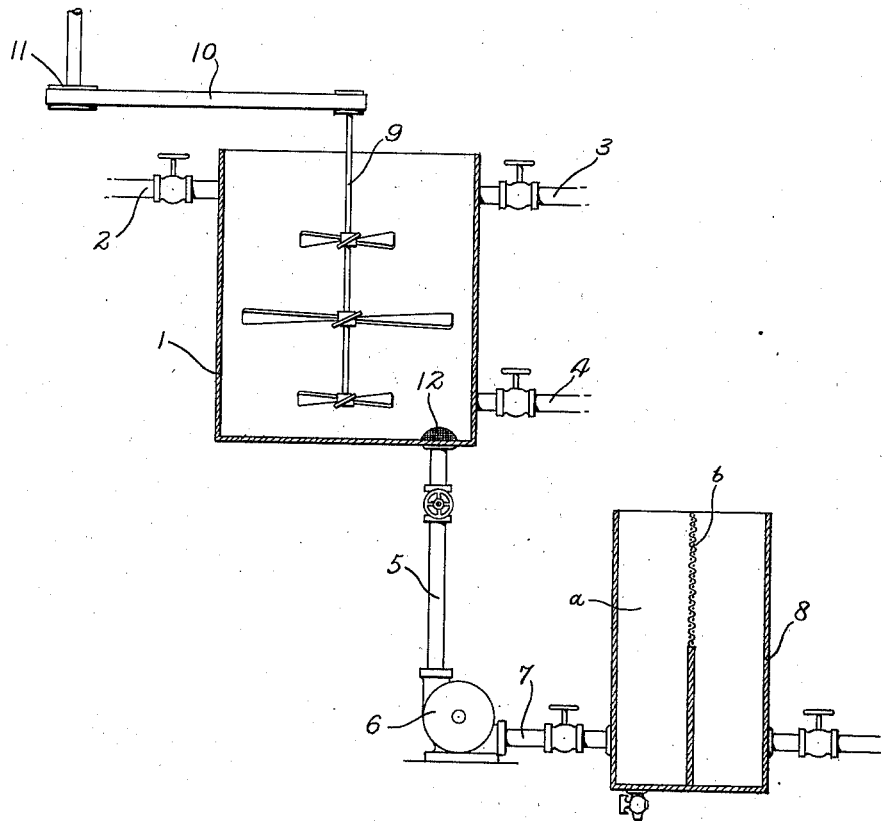
INVENTORS
Cornelius V. Werner
BY Carl Schreiner
Blair Curtis & Dunne
their ATTORNEYS Patented Oct. 13, 1936

2,057,352

UNITED STATES PATENT OFFICE 2,057,352

METHOD OF BREWING

Cornelius V. Werner, Richmond Hill, and Carl Schreiner, Brooklyn, N. Y., assignors to Charles J. Werner, trustee, Richmond Hill, Long Island, N. Y.

Application May 23, 1933, Serial No. 672,392

1 Claim. (Cl. 99—39)

The present invention relates to an improvement in method of brewing and the product of such method. In accordance with known practice in making beer, it has been customary, after preparing the beer wort, to bring about in a suitable tank or vat a primary yeast fermentation which may be completed under some conditions in a period of from seven to nine days or thereabouts. At the end of this time, during which a substantial portion of the undissolved and undispersed solids including yeast cells settle out and form a sludgy mass at the bottom of the tank, the relatively clear portion of the liquid, now "green" beer, is withdrawn into another tank or vat where an after fermentation takes place, after which it is clarified and is then stored under favorable temperature conditions. In after fermentation, or "lagering", a further and gradual breaking down of the yeast and of the soluble or convertible solids takes place thus increasing the extract and alcoholic content to develop the desirable flavor and other characteristics which distinguish good lager beers from others.

It has been found that effective conversion or dissolving of the undissolved solids or extractive matter occurring in the green brew requires that the beer be lagered or allowed to remain quiet at favorable temperatures over a period of from three to six months, and possibly more in some cases. This considerably increases the cost of the product and, under current conditions, constitutes a difficulty of major importance.

One object of the present invention has been to provide a process or method whereby the desirable effects now normally produced by aging the brew may be obtained by mechanical treatment thereof for a very short time, as compared to the lagering period. Furthermore, our improved method enables us to retain in the beer a larger percentage of the flavoring or other extract constituents, which under common practice, are filtered out or settle out in the form of sludge to be disposed of as waste; and in this respect the product obtained by the use of our apparatus and method is deemed to possess novel properties heretofore not found in beers brewed according to known methods.

One form of apparatus adapted to be employed in the practice of our process or method is illustrated diagrammatically in the drawing accompanying this specification. Referring thereto, that portion of the general apparatus employed in brewing and to which our invention is applied includes a vat or tank 1 provided with any suitable inlet means, as an inlet pipe 2 and outlets, as pipes 3, 4, and 5, preferably controlled by suitable valves. The outlet pipe 5 has one end opening through the bottom wall of tank 1, and its other end connected to discharge into a dispersion machine, as a pressure homogenizer 6. An outlet 7 from the dispersion machine 6 connects said machine with a filtering or clarifying device 8. The tank 1 is equipped with suitable agitating or stirring means such as an agitator 9 which may be actuated by any effective means, as a belt 10 driven from any suitable source of power such as a pulley 11.

The dispersion machine 6 is preferably of the pressure homogenizer type, the characteristics of which are described by Travis in his book "Mechano Chemistry and the Colloid Mill", 1928, beginning page 117. It will be understood that suitable apparatus also includes usual accessory devices, such, for example, as a strainer 12 and a motor or other source of power, not shown, for operating the homogenizer.

In practicing our method with apparatus of the kind above described, or the equivalent thereof, after primary fermentation of the beer wort in the tank 1, for example, the stirring device or agitator is actuated to more or less uniformly distribute the sediment, residue, or sludge containing yeast cells and/or other solid matter which has settled in the bottom of tank 1 during and after completion of said primary fermentation. The valve which controls pipe 5 is opened and the intermediate product consisting of green beer together with the stirred in sediment above referred to, is passed through the pressure homogenizer 6 wherein the undissolved or undispersed particles of extracts and/or other desirable solids are rapidly and effectively dispersed in the liquid. The material or intermediate product so treated may under some conditions require a relatively short period of rest to permit flocculation. In the illustrated apparatus, this may occur in the chamber marked a of clarifier 8 after which the liquid passes through the filter portion or medium b; or flocculation may be made to occur in a separate tank or vat after which the beer is withdrawn and passed through a clarifier of any suitable type or construction. It will be understood that during the operations above described, precautions are taken, where necessary, to control the temperature and/or other conditions which affect or bear upon the quality of the ultimate product.

It will be noted in connection with the foregoing description of our improved method that, instead of filtering the green beer or permitting the greater part of the solids to separate out of the green beer by sedimentation after primary fermentation, we prefer to retain therein a substantial portion of said solids for the purpose of causing a greater proportion thereof to become incorporated or dispersed in the final product. This is effected by the mechanical dispersion or homogenization under pressure above described, or its equivalent, more completely and beneficially than by normal aging processes and in a measurably shorter time. The beer so treated or produced contains extractive ingredients and other valuable solid constituents which contribute thereto a fuller flavor and more desirable characteristics than it would have if processed entirely according to presently known practice.

In addition to the substantial saving of time effected in the production of beer by the use of our invention, it is contemplated that a greater quantity of beer of fine flavor and other good qualities can be made with the same quantity of malt, hops and yeast per barrel of product as is required under known methods, thus further reducing the per barrel cost.

We claim:—

The method of brewing to produce, without aging, a beer having characteristics of lager beer, which includes the steps of effecting primary yeast fermentation of a beer wort to form an intermediate product containing green beer and particles of solid matter including yeast cells, agitating said intermediate product to produce distribution of said solid matter therein, subjecting the whole of said intermediate product to pressure homogenization and clarifying the homogenized product.

CORNELIUS V. WERNER.
CARL SCHREINER.